(12) United States Patent
Gupta et al.

(10) Patent No.: US 9,152,154 B2
(45) Date of Patent: Oct. 6, 2015

(54) MULTI-DIMENSIONAL HEATING AND COOLING SYSTEM

(75) Inventors: Sachin Gupta, Karnakata (IN); Sara H. Basson, White Plains, NY (US); Dimitri Kanevsky, Ossining, NY (US); Tara N. Sainath, New York, NY (US); Pam Nesbitt, Yorktown, NY (US); Dan Ning Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 13/564,006

(22) Filed: Aug. 1, 2012

(65) Prior Publication Data

US 2014/0039691 A1    Feb. 6, 2014

(51) Int. Cl.
  *G05D 23/00*    (2006.01)
  *G05D 23/19*    (2006.01)
  *F24F 11/00*    (2006.01)

(52) U.S. Cl.
  CPC ........ *G05D 23/1932* (2013.01); *F24F 11/0001* (2013.01); *F24F 2011/0057* (2013.01)

(58) Field of Classification Search
  None
  See application file for complete search history.

(56) References Cited

U.S. PATENT DOCUMENTS

| | | | |
|---|---|---|---|
| 5,029,572 A | 7/1991 | LeBlanc | |
| 5,156,203 A * | 10/1992 | Funakoshi et al. | 165/207 |
| 5,353,605 A | 10/1994 | Naaman | |
| 5,433,083 A | 7/1995 | Kuramarohit | |
| 5,533,354 A | 7/1996 | Pirkle | |
| 5,709,203 A | 1/1998 | Gier | |
| 5,761,992 A | 6/1998 | Gallo | |
| 5,762,265 A * | 6/1998 | Kitamura et al. | 236/51 |
| 5,839,654 A | 11/1998 | Weber | |
| 5,867,999 A | 2/1999 | Bratton et al. | |
| 5,971,597 A * | 10/1999 | Baldwin et al. | 700/277 |
| 6,009,713 A | 1/2000 | Horn | |
| 6,089,226 A | 7/2000 | Gier | |
| 6,131,645 A | 10/2000 | Barr | |
| 6,241,156 B1 * | 6/2001 | Kline et al. | 236/49.3 |
| 6,498,955 B1 * | 12/2002 | McCarthy et al. | 700/1 |
| 6,513,521 B1 | 2/2003 | Gier et al. | |
| 6,754,561 B2 * | 6/2004 | Matsui et al. | 700/277 |

(Continued)

FOREIGN PATENT DOCUMENTS

| | | | |
|---|---|---|---|
| JP | 2010019769 A | | 1/2010 |
| WO | WO 87/02773 | * | 5/1987 |

(Continued)

OTHER PUBLICATIONS

Feldmeier, M.; Paradiso, J.A., "Personalized HVAC control system," Internet of Things (IOT), pp. 1,8, Nov. 29, 2010-Dec. 1, 2010.*

(Continued)

*Primary Examiner* — Darrin Dunn
*Assistant Examiner* — Christopher E Everett
(74) *Attorney, Agent, or Firm* — Ryan, Mason & Lewis, LLP

(57) ABSTRACT

Methods and system for facilitating multi-dimensional personal heating and cooling. User information is used as a mean to configure the temperature in a surrounding environment, thereby facilitating comfort for a user and, in the case wherein multiple users are accessing an area, classifying the area into a number of regions and maintaining each region at a different temperature and guiding the users to desired regions.

25 Claims, 5 Drawing Sheets

(56) References Cited

U.S. PATENT DOCUMENTS

| | | |
|---|---|---|
| 6,865,449 B2* | 3/2005 | Dudley ................ 700/276 |
| 7,089,087 B2* | 8/2006 | Dudley ................ 700/276 |
| H002176 H* | 12/2006 | Meyer et al. ............ 236/51 |
| 7,397,380 B1* | 7/2008 | Smolsky ............ 340/573.1 |
| 7,674,281 B2 | 3/2010 | Worm |
| 7,702,421 B2* | 4/2010 | Sullivan et al. ........ 700/276 |
| 7,809,471 B2* | 10/2010 | Murakami et al. ...... 700/276 |
| 7,918,100 B2* | 4/2011 | Breed et al. ............. 62/244 |
| 7,921,036 B1* | 4/2011 | Sharma et al. ........ 705/14.66 |
| 8,020,778 B2* | 9/2011 | Murakami et al. ........ 236/1 C |
| 8,036,778 B2 | 10/2011 | Masuda et al. |
| 8,132,737 B2* | 3/2012 | Eichholz et al. ......... 236/1 B |
| 8,270,682 B2* | 9/2012 | Stubler ................ 382/118 |
| 8,369,995 B2* | 2/2013 | Nanami ................ 700/277 |
| 8,417,388 B2* | 4/2013 | Altonen et al. ......... 700/278 |
| 2004/0179736 A1* | 9/2004 | Yin ................ 382/191 |
| 2009/0057427 A1* | 3/2009 | Geadelmann et al. ...... 236/51 |
| 2009/0065596 A1 | 3/2009 | Seem et al. |
| 2009/0171478 A1* | 7/2009 | Wong ................ 700/13 |
| 2011/0295544 A1 | 12/2011 | Ueda et al. |
| 2012/0031984 A1 | 2/2012 | Feldmeier et al. |
| 2013/0232996 A1* | 9/2013 | Goenka et al. ............ 62/3.61 |

FOREIGN PATENT DOCUMENTS

| | | |
|---|---|---|
| WO | 2005024311 A1 | 3/2005 |
| WO | 2012005033 A1 | 1/2012 |

OTHER PUBLICATIONS

Federspiel, Clifford C.; Asada, Harubiko, "User-Adaptable Comfort Control for HVAC Systems," American Control Conference, 1992, vol., no., pp. 2312-2319, Jun. 24-26, 1992.*

Arens, E. and Federspiel, C.C. and Wang, D. and Huizenga, C., How Ambient Intelligence will Improve Habitability and Energy Efficiency in Buildings, in Ambient Intelligence, Springer Berlin Heidelberg, pp. 63-80, 2005.*

Bing Li, Xiao-Chen Lian, Bao-Liang Lu, Gender classification by combining clothing, hair and facial component classifiers, Neurocomputing, vol. 76, Issue 1, Jan. 15, 2012, pp. 18-27.*

Ming Yang; Kai Yu, Real-time clothing recognition in surveillance videos, Image Processing (ICIP), 2011 18th IEEE International Conference on, p. 2937-2940, Sep. 11-14, 2011.*

Gallagher, A.C.; Tsuhan Chen, Clothing cosegmentation for recognizing people, Computer Vision and Pattern Recognition, 2008. CVPR 2008. IEEE Conference on, pp. 1-8, Jun. 23-28, 2008.*

Ming Yang; Shenghuo Zhu; Fengjun Lv; Kai Yu, Correspondence driven adaptation for human profile recognition, Computer Vision and Pattern Recognition (CVPR), 2011 IEEE Conference on, pp. 505-512, Jun. 20-25, 2011.*

Edward D. Rich, The Michigan State Board of Health, Public Health: Home Ventilation, Jan. 1916.*

Feldmeier et al., Personalized Building Comfort Control, Massachusetts Institute of Technology, Issue date: 2009, pages 1-14.

Guo et al., Technologies Toward Thermal Comfort-Based and Energy-Efficient HVAC Systems: A Review, Systems, Man and Cybernetics, 2009. SMC 2009. IEEE International Conference on Date of Conference: Oct. 11-14, 2009.

Etik et al., Fuzzy Expert System Design for Operating Room Air-Conditions Control Systems, Expert Systems with Applications vol. 36, Issue 6, Aug. 2009, pp. 9753-9758.

Ploennings et al., Wireless, Collaborative Virtual Sensors for Thermal Comfort, Proceeding BuildSys'10 Proceedings of the 2nd ACM Workshop on Embedded Sensing Systems for Energy-Efficient in Building pp. 79-84.

* cited by examiner

MULTI-DIMENSIONAL HEATING AND COOLING SYSTEM

BACKGROUND

Maintaining a comfortable temperature in an indoor environment, which is generally heated or cooled in order to ensure the comfort of inhabitants or users of that environment, can be a challenging task. There is typically no link between the setting of a thermostat or sensor and a comfort level required by an individual. In many cases, rooms or a given area can be heated and/or cooled even though no one is physically present in the space. The result is wasted heating and/or cooling resources.

BRIEF SUMMARY

In summary, the disclosure provides a method, system and computer program product for controlling the temperature of an environment, typically a user environment. The first embodiment includes controlling the temperature of the user environment by first determining the temperature required by a user, wherein the user's clothing includes at least one sensor that can read the surrounding temperature and communicate with a master control to heat or cool the surrounding region of the user, thereby making the user's surrounding environment comfortable for the user. In one embodiment, the sensor can be configured to receive an input from a user and communicate with a master control to set the temperature in the user's surrounding environment to the comfort level of the user. In a further embodiment, the sensor can also include a thermostat, a thermocouple, a semiconducting material and/or any other device that can measure temperature. In a further embodiment, the sensor may determine the surrounding temperature of the user's environment and, depending on the input received about the surrounding environment, the user is further allowed to change the temperature to a desired level.

In a further embodiment, an area is subdivided into several regions and the area has a master control which monitors the temperature of the various regions. The master control is configured to control the temperature of each region in the area at different levels such that multiple users can configure the temperature of a region or be guided to a region wherein the temperature of the regions matches the temperature desired by the user. One or more sensors can monitor each region and communicate with the master control, thereby keeping the temperature in given/desired regions at the desired level.

In yet a further embodiment, the user can input a desired temperature to the sensor, and the sensor communicates with the master control to locate a region with the desired temperature and facilitate a match between the user and the region with the desired temperature.

In yet a further embodiment, where there is a plurality of users in a given region, the sensors from the plurality of users communicate with the master control a desired temperature of each user and the master control computes an optimal average temperature for the region and sets the temperature to the determined average temperature.

In yet a further embodiment, the master control reads a user's desired temperature and assists the user to move to a region wherein the desired temperature of the user and the temperature of the region match.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
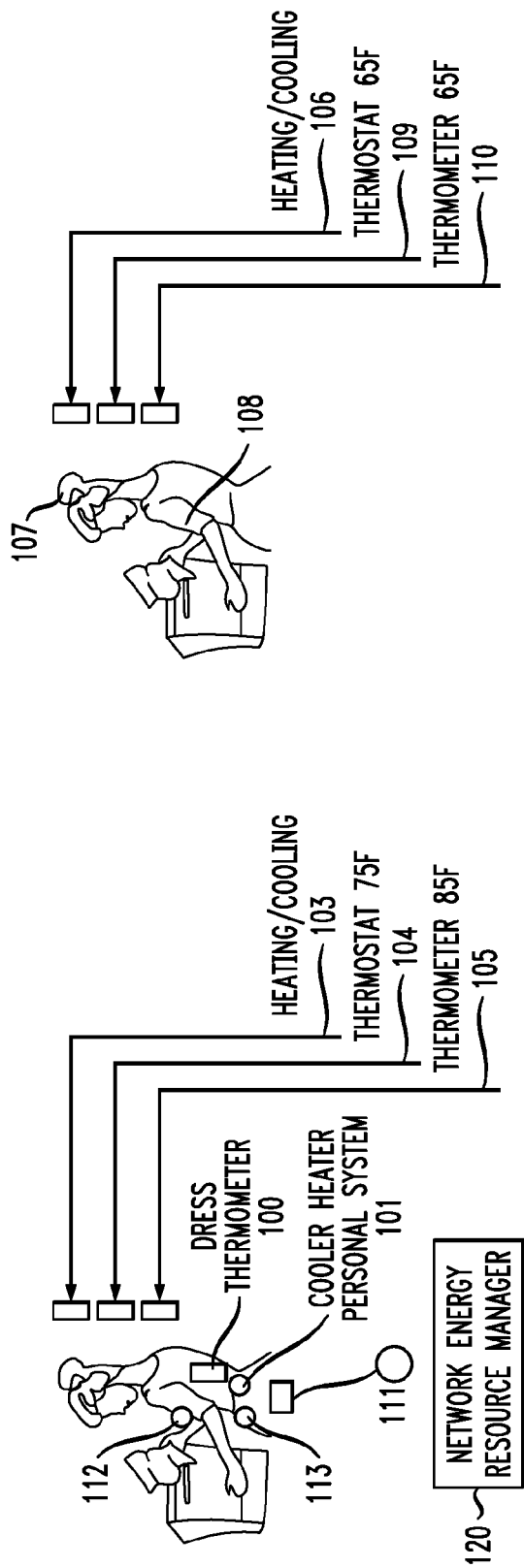
FIG. 1 schematically illustrates a personal heating and cooling system with personal components thereof, in accordance with at least one embodiment of the invention.

It should be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that the various embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description makes reference to the figures. The illustrated embodiments of the invention will be best understood by reference to the figures. The following description is intended only by way of example and simply illustrates certain selected example embodiments of the invention as claimed herein.

It should be noted that the flowchart and block diagrams in the figures illustrate architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIG. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, in conjunction with a master control 15' whether on a server computer, a client computer, a node computer in a distributed network, or any combination thereof.

FIG. 1 illustrates a schematic of a personal heating and cooling system including personal components thereof, as broadly contemplated herein, in accordance with at least one embodiment of the invention. As such, a personal heating and cooling component that is associated with a user's clothing can be referred to as a "personal temperature regulator" (hereinafter also referred to as PTR), which can include a sensor or a semiconducting material, a thermocouple, or the like. The PTR can be placed at various points in or on the user's clothing or person, so that the heat (or cold) is distributed evenly in the surrounding environment. For example, if the user desires the temperature to be 21° centigrade, and the user is located in an office where the temperature above the desk may be 21° C., but below the desk can be lower or greater than 21° C., thereby causing some amount of discomfort, the sensors will detect such non-uniformity and communicate with a master control such that the temperature around the user and the surrounding environment is evenly distributed. The PTR system can also wirelessly communicate with a room's thermostat (herein after also broadly referred to as a master control), in order to facilitate heating and cooling resources not being squandered.

Thus, in accordance with at least one embodiment of the invention, components of a PTR can include a dress or clothing thermometer (sensor) 100, which can be configured to also measure other parameters such as humidity, and personal cooling/heating elements 101,112 and 113 for providing spot cooling or heating to a user. As such, a communication module 111 receives temperature feedback, as well as feedback for one or more other parameters such as humidity, from personal thermometer 100 and can communicate wirelessly with a network energy resource manager 120 that accepts such feedback. Resource manager 120, in turn, can regulate the personal elements 101, 112 and 113 advantageously without any human intervention.

Additionally, in accordance with at least one embodiment of the invention, a room or apartment 103 heating/cooling element, that is, an element that provides heat or cooling to a room, apartment, or a portion of a room or apartment, can also be controlled by resource manager 120. Additional input for the resource manager 120, in controlling personal elements 101, 112 and 113 and/or room/apartment heating/cooling element 103, can be provided via a thermostat 104 and thermometer 105. In other words, a user can set the thermostat 104 for a room, apartment or portion of a room or apartment, with thermometer 105 providing feedback by way of helping control heating/cooling element 103. However, such control can also extend to personal elements 101, 112 and 113 in accordance with any of a variety of parameters and considerations as broadly contemplated herein.

In accordance with at least one embodiment of the invention, if the PTR indicates that a person's temperature is at desired target levels, the external thermostat 104 can respond accordingly. For example, the air conditioning can be shut down if the person is sufficiently cool as indicated by the PTR. Thus, as shown here by way of an illustrative and non-restrictive example, in accordance with at least one embodiment of the invention, the thermostat 104 is set at 21 degrees Centigrade, while the thermometer 105 reads 27 degrees Centigrade. This can reflect a typical thermostat setting in response to a high ambient room temperature. However, the thermostat 104 and cooling system can be shut down if, indeed, individual elements 101, 112 and 113 are already sufficient to keep a person cool, or within a desired or predetermined measured temperature range as measured, for example, via personal thermometer 100.

In accordance with at least one embodiment of the invention, a case can be considered in which a camera or monitoring device is located proximate to the user sends information about a user's clothing to an apartment, room or building cooling/heating system that estimates user comfort conditions, and regulates a heating/conditioning system accordingly. For example, if the system finds that a user is wearing a warm jacket, the system can reduce heat to save energy. Such an example is indicated in FIG. 1, where a camera is able to record if there is any headgear at the area indicated by 107 or other clothing at the general area indicated by 108. Thus, the heating/cooling system of a room, apartment, or room/apartment portion can adjust the heating/cooling delivered by an element 106, while a thermostat/thermometer combination 109 and 110 can essentially be modified or overridden by receipt and processing of the aforementioned visual data. Again, for example, if a user is wearing a jacket, then the jacket would make the user feel uncomfortable if the temperature of the room was too high. The monitoring device proximate to the user can send information about the user's clothing and behavior, i.e., the user is wearing the jacket due to illness, and the temperature in the surrounding environment of the user can be controlled to make the user feel comfortable without removing the jacket or warm clothing. In another embodiment, as soon as the user removes the warm clothing, the monitoring device can transmit information to control the temperature in the user's surrounding environment accordingly to make the user comfortable.

In accordance with at least one embodiment of the invention, a system can use biometrics or any other type of monitoring device to determine a user's approximate age and other physical variables. For example, a baby may require a higher ambient temperature than an adult. The system can also determine the comfort level of a user. For instance, the system can use sensors to ascertain a user's degree of comfort, e.g., via a video camera and associated analysis of user emotions, and/or via sensors that are placed on a user's body. There can be user history data and user feedback availed that permits a prediction of a user's expected comfort in given conditions.

It can also be recognized, in accordance with at least one embodiment of the invention, that there may be a problem in having one person override a heating/cooling setting in a way to make others uncomfortable. As such, a heating/cooling management system can take into account the comfort of all users, and thereupon determine an optimized scheme, for example, an average temperature that strikes a balance between the degrees of comfort of different users. The system may also permit temperature regulation in or within any room locally, and this may help address different user requirements or individual degrees of comfort.

Figure 2:
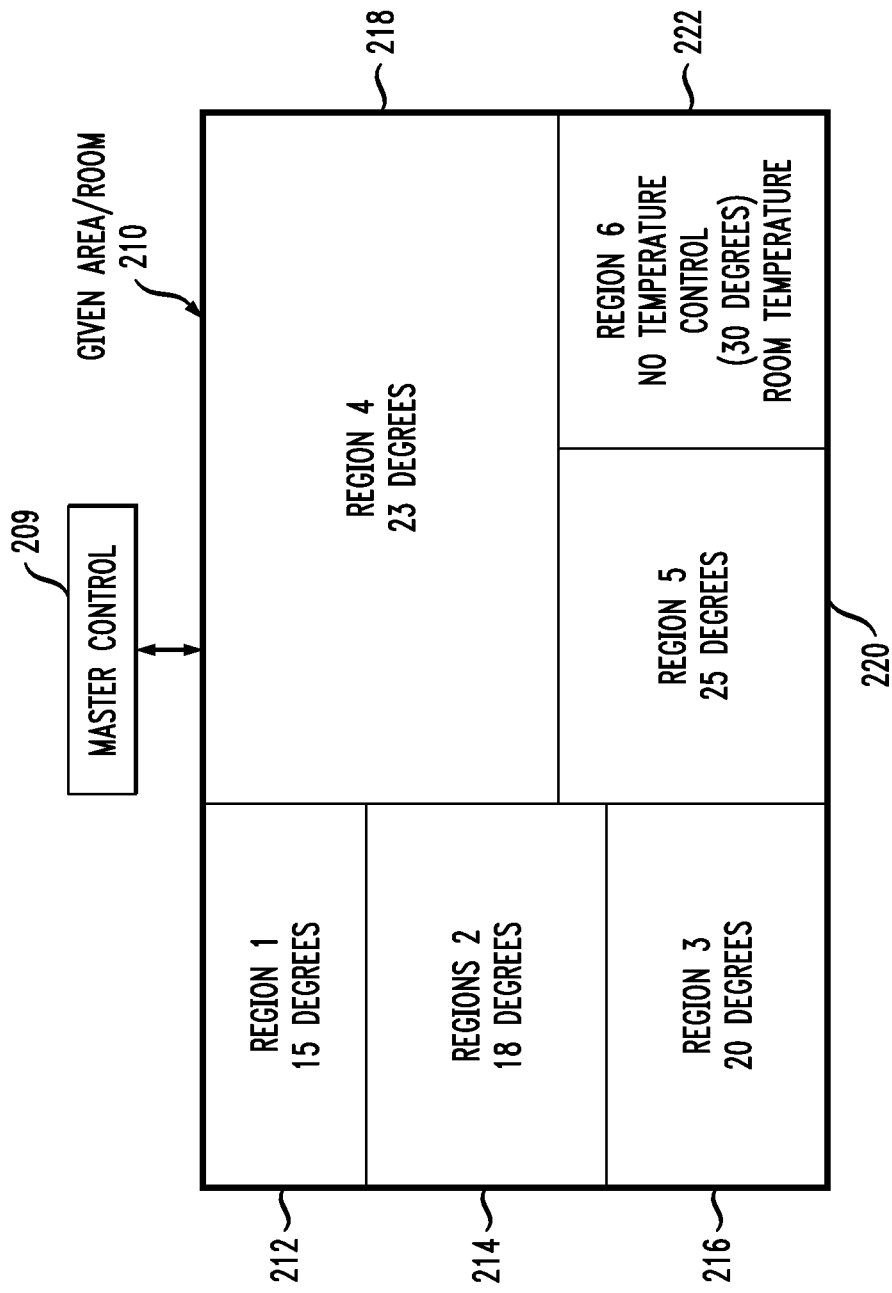
FIG. 2. illustrates a room divided into a number of regions, wherein the master control of the room maintains different temperature levels in different regions, in accordance with at least one embodiment of the invention.

As illustrated in FIG. 2, in another embodiment, the room 210 (also referred to as a given area) can be divided into a number of regions, wherein the master control 209 of the room is allowed to maintain different temperature levels in different regions. In at least one embodiment of the invention, towards the end of each region, there would be a gradient. If a user entering a room desires a particular temperature, the user may input the temperature to master control 209 and/or input can be fed by means of a sensor on the user's clothing. The master control 209 will direct the user to the appropriate region where the user desired temperature is maintained. This, for example, is advantageous in larger halls/room having multiple users with varying needs.

As illustrated, the given area or room 210 is in communication with a master control 209. The room 210 is divided into various regions. For example, in this depiction, six regions having different temperatures maintained for each of the regions are illustrated. Region-1 212 is maintained at temperature of 15 degrees by the master control 209. Region-2 214 is maintained at a temperature of 18 degrees. Region-3 216 is maintained at a temperature of 20 degrees. Region-4 218 is maintained at a temperature of 23 degrees. Region-5 220 is maintained at a temperature of 25 degrees, and assuming the room temperature is 30 degrees, Region-6 222 is maintained at room temperature of the outside natural temperature of 30 degrees.

Assume, for example, that a first user desires a temperature of 20 degrees. The user input is read by the master control 209 and the user is guided to region-3 automatically, which is maintained at 20 degrees. A second user desires a temperature of 23 degrees, and the master control 209 guides the user to region-4, where the temperature is maintained at 23 degrees. This way, all users entering the given area 210 can be guided to a comfort zone of their temperature preference, or approximate thereto. If the user desires a temperature that is not provided in the regions, the user is guided to a region that closely matches the desired temperature of the user. If there are no users in a particular temperature zone/region, the master control can reset the temperature of that region to a temperature that is desired by most occupants of the room.

Figure 3:
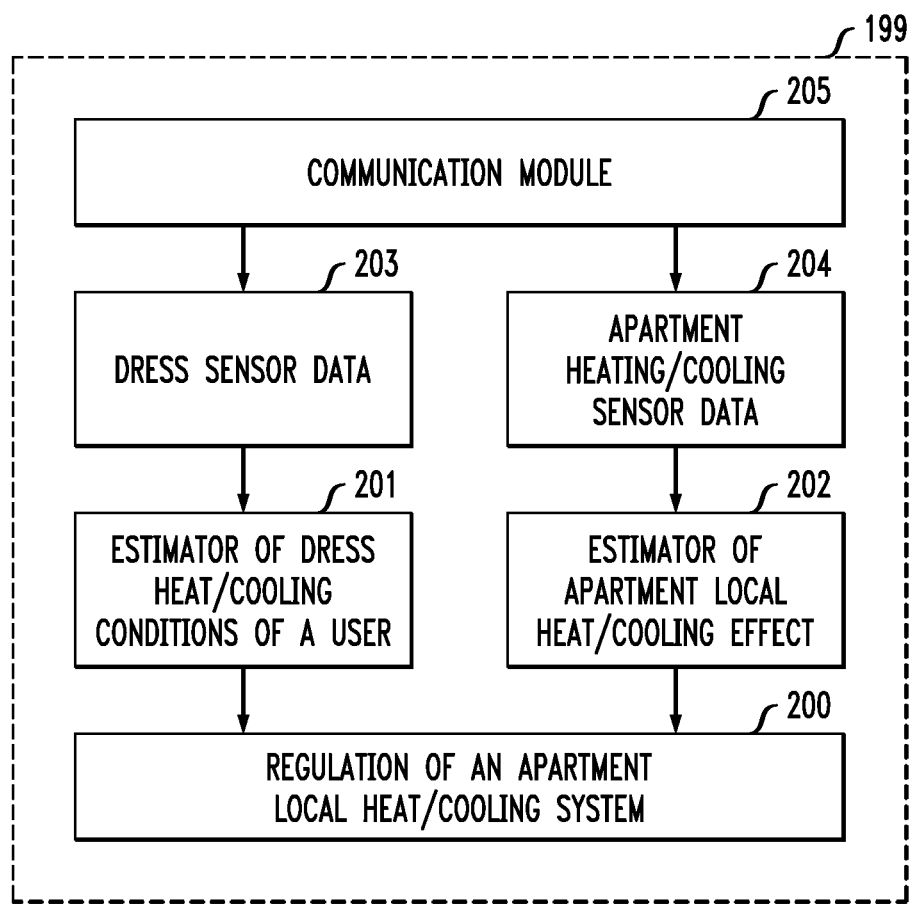
FIG. 3 illustrates a network energy resource manager, in accordance with at least one embodiment of the invention.

FIG. 3 illustrates a network energy resource manager 199, in accordance with at least one embodiment of the invention. Indicated at 205 is a communication module that receives, for example, from sensors in a room or apartment and from a user's clothing, information about temperatures in one or more locations and overall conditions of a user such as type of clothing and/or user biometrics that can be used to identify user characteristics such as age, etc. The data can be sent via wireless transmitters located in a user personal cooling/heating system and from transmitters connected to thermometers in a room.

In accordance with at least one embodiment of the invention, components 203 and 204 depict sensor data retrieved from a user's clothing/dress and from room/apartment sensors, respectively. The data 203 and 204 are sent, respectively, to estimators which estimate dress/clothing and heating/cooling conditions of a user 201 and local heating/cooling effects in a room/apartment 202. Such data permit a user to estimate if he/she is comfortable with his/her personal temperature.

The estimation data are sent to a regulation module 200, where regulation of a room/apartment heating/cooling system is undertaken. For example, if it is determined that a user desires more heating, the room/apartment heating system is activated to provide more heat at or near the user's location.

Figure 4:
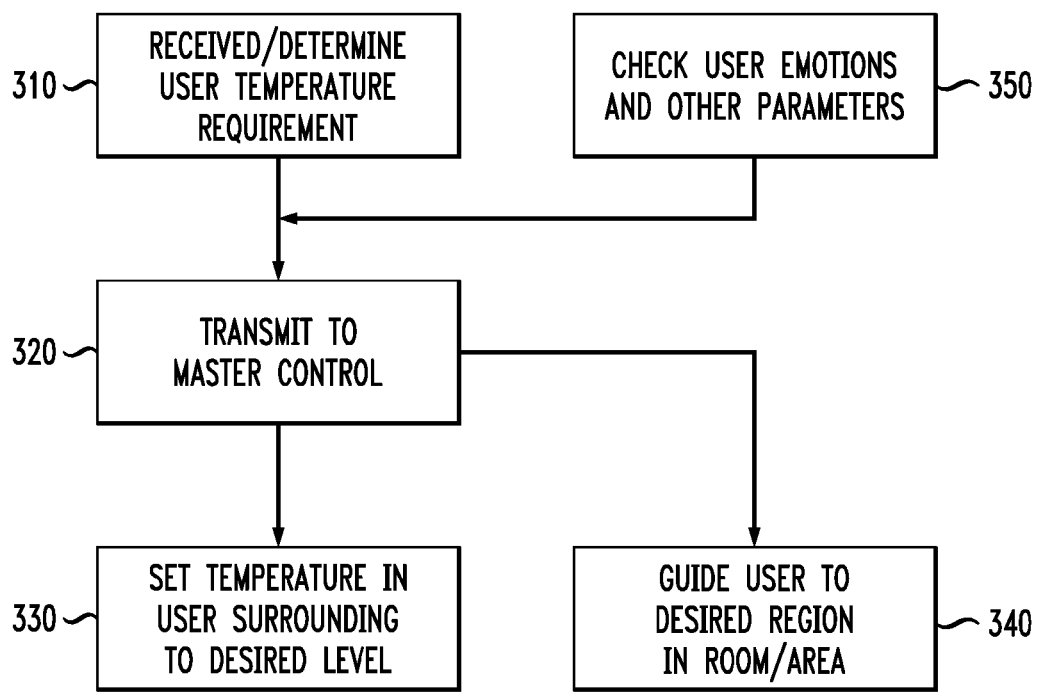
FIG. 4 illustrates a flow diagram for controlling the temperature in a surrounding environment of a user, in accordance with at least one embodiment of the invention.

Reference is now made to FIG. 4, which illustrates a method of controlling the temperature in a surrounding environment of a user. In Step 310, the user requirement (or desired temperature) is received as input or can be determined from the sensors placed on the user's clothing or person. In one embodiment, the user may input the desired temperature, and the sensors on the user clothing can record these. Once the requirements or preferences of the user are determined, this information is transmitted to a master control in step 320. The master control configures and maintains the temperature in the user's surrounding environment at a desired level requested by the user as illustrated in step 330.

In another embodiment, when there are multiple users, the requirement or preference for each user is transmitted to the master control and the master control will guide the user to a particular region in a given area as illustrated in step 340. In a further embodiment, the sensors or external monitoring devices in and around the user may provide additional inputs to the master control such as the estimated age, emotions, etc., associated with the user and the master control can perform step 330 or step 340 depending on the circumstance.

Figure 5:
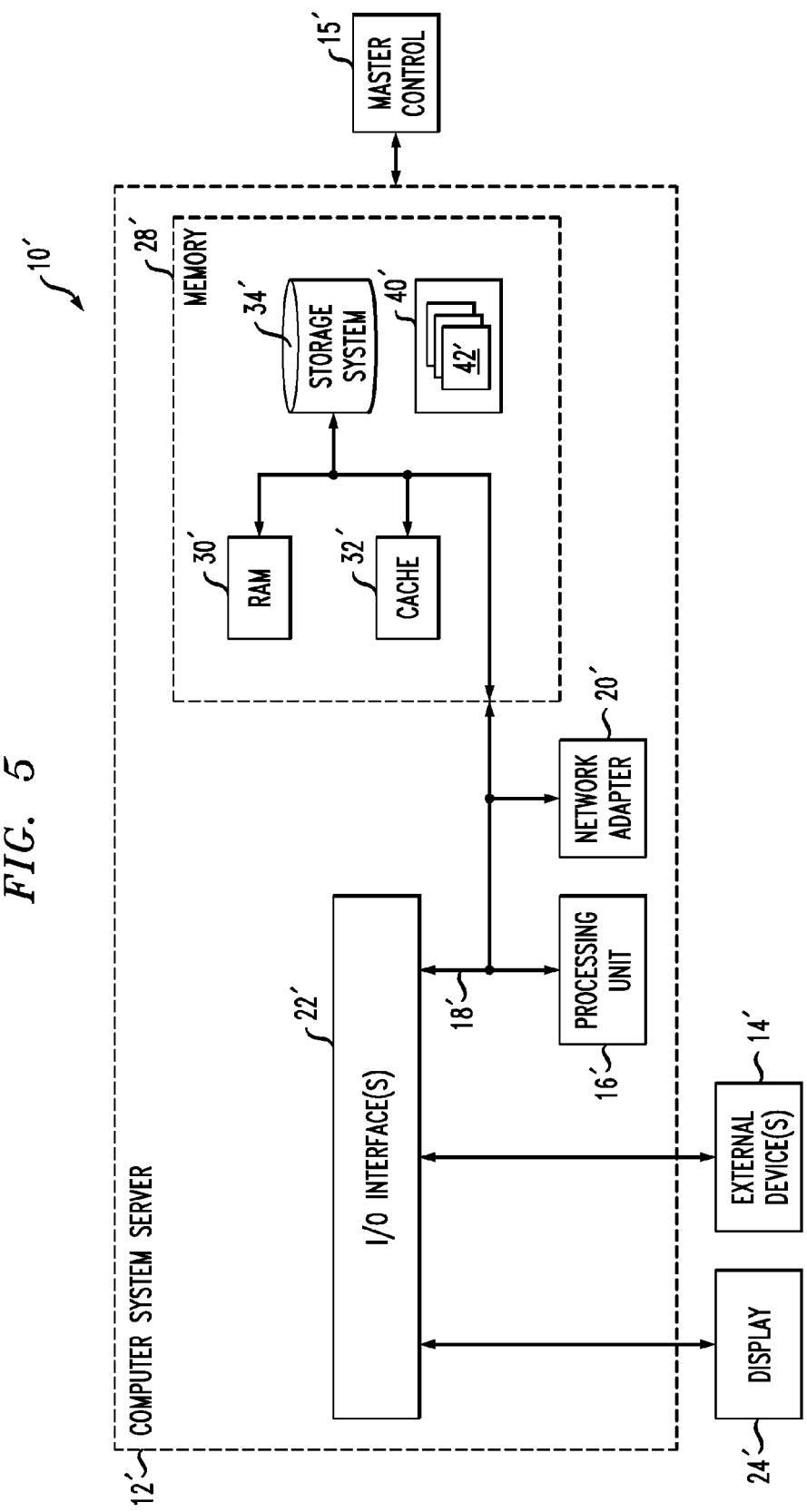
FIG. 5 illustrates a computer system, in accordance with at least one embodiment of the invention.

Referring now to FIG. 5, a schematic of an example cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node." The computing node 10' is in direct communication with a master control 15', wherein the master control is configured to set and maintain the temperature around a user's surrounding environment to make the user comfortable. In one embodiment, the computer node 10' can itself be the master control configured to receive information/data from the user and other external devices and provide the user with an ambient environment.

In cloud computing node 10', there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network personal computers (PCs), mini-computer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

Computer system/server 12' in cloud computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via input/output (I/O) interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium (for example, a tangible computer readable medium) having computer readable program code embodied thereon.

Any combination of computer readable media may be utilized. The computer readable medium may be a computer readable signal medium or a tangible computer readable storage medium. A tangible computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for controlling temperature in a user environment, the method comprising:
    receiving input user area temperature data captured and transmitted from a sensor affixed to a user's clothing, wherein said input user area temperature data comprises one or more temperature measurements of a surrounding area of the user;
    receiving input user clothing data captured and transmitted from a monitoring device, wherein said input user clothing data comprises identification of one or more items of clothing currently worn by the user;
    determining an approximate age of the user based on (i) biometric data transmitted from the monitoring device, wherein said biometric data comprises at least ambient temperature associated with the user, and (ii) said identification of the one or more items of clothing currently worn by the user transmitted from the monitoring device;
    receiving input room temperature data captured and transmitted from a sensor positioned in a room currently occupied by the user, wherein said input room temperature data comprises one or more temperature measurements of the room currently occupied by the user; and
    providing instruction to the user to move to a given area in the room currently occupied by the user based on (i) said input user area temperature data, (ii) said input user clothing data, (iii) said input room temperature data and (iv) said approximate age of the user.

2. The method as claimed in claim 1, comprising:
    determining an optimal temperature for the user; and
    receiving an input from the user regarding an optimal temperature desired by the user.

3. The method as claimed in claim 2, comprising:
    communicating the optimal temperature to a master control, wherein the master control is configured to adjust the temperature in the user's surrounding environment.

4. The method as claimed in claim 1, wherein the sensor comprises at least one of a thermostat, a semiconducting material, a thermocouple and a RFID tag.

5. The method as claimed in claim 1, wherein the sensor is configured to receive an input temperature.

6. The method as claimed in claim 1, wherein the sensor is configured to detect the temperature of the surrounding area of the user and inform the user.

7. The method as claimed in claim 1, wherein, based on user historical data, the sensor is configured to recommend a preferred temperature as input to the master control.

8. The method as claimed in claim 1, wherein the monitoring device includes at least one of a sensor, camera, RFID tags, an acoustic sensor, a visual sensor, a semiconducting device, and a thermocouple.

9. The method as claimed in claim 1, wherein the monitoring device is configured to capture user related information and transmit the information to a master control.

10. The method as claimed in claim 9, wherein the master control is configured to compute an optimal temperature for the user and adjust the temperature in the environment surrounding the user to the optimal temperature.

11. The method as claimed in claim 9, wherein the master control is configured to monitor the temperature of the environment surrounding the user and modify the temperature accordingly by raising or lowering the temperature.

12. The method as claimed in claim 9, wherein the master control is configured to automatically control an air conditioning unit.

13. A method for controlling temperature in an area, the area being sub-divided into at least two or more regions, the method comprising:
    receiving input user area temperature data captured and transmitted from (i) a first sensor affixed to a first user's clothing in a first of the two or more regions and (ii) a second sensor affixed to a second user's clothing in a second of the two or more regions, wherein said input user area temperature data comprises one or more temperature measurements of a surrounding area of the corresponding user;
    receiving input user clothing data captured and transmitted from at least one monitoring device, wherein said input user clothing data comprises identification of one or more items of clothing currently worn by at least the first user and the second user;

determining an approximate age of the first user and the second user based on (i) biometric data transmitted from the monitoring device, wherein said biometric data comprises at least ambient temperature associated with the first user and the second user, and (ii) said identification of the one or more items of clothing currently worn by the first user and the second user transmitted from the monitoring device;

receiving input region temperature data captured and transmitted from at least (i) a sensor positioned in the region currently occupied by the first user and (ii) a sensor positioned in the region currently occupied by the second user, wherein said input region temperature data comprises one or more temperature measurements of the region currently occupied by the corresponding user; and providing instruction to each of the first user and the second user to move to one of the two or more regions based on (i) said input user area temperature data, (ii) said input user clothing data, (iii) said input region temperature data and (iv) said approximate age of the first user and the second user.

14. The method as claimed in claim 13, comprising:
receiving an input temperature preferred by a user;
transmitting the input temperature to a master control;
guiding the user to the region with a temperature that most closely matches the input temperature preferred by the user.

15. The method as claimed in claim 14, wherein the at least two regions in the area include a number of sensors transmitting the temperature of the surrounding environment of each region to the master control.

16. The method as claimed in claim 14, wherein the master control is configured to at least one of heat and cool each region, maintaining the temperature within each region constant.

17. A method of controlling temperature in an area, the method comprising:
receiving, as input, a temperature setting from each of a plurality of users, wherein the users are located in the area and the input is transmitted to a master control for the area, and wherein the temperature setting from each of the plurality of users comprises:
one or more temperature measurements of a portion of the area surrounding the corresponding user; and
identification of one or more items of clothing currently worn by the corresponding user;
an approximate age of each of the plurality of users based on (i) biometric data, wherein said biometric data comprises at least ambient temperature associated with each of the plurality of users, and (ii) the identification of the one or more items of clothing currently worn by each of the plurality of users; and
providing instruction to each of the plurality of users to move to a given portion of the area based on (i) said one or more temperature measurements, (ii) said identification of one or more items of clothing, and (iii) said approximate age of each of the plurality of users.

18. The method as claimed in claim 17, wherein the master control is configured to at least one of heat and cool the given area, maintaining the temperature within the area constant.

19. The method as claimed in claims 17, wherein the master control includes a sensor configured to measure and maintain temperature in the area.

20. A system for controlling temperature in a user environment, the system comprising at least a processor and a memory and configured for:
receiving input user area temperature data captured and transmitted from a sensor affixed to a user's clothing, wherein said input user area temperature data comprises one or more temperature measurements of a surrounding area of the user;
receiving input user clothing data from a monitoring device, wherein the monitoring device includes at least one of a sensor, a camera, an RFID tag, an acoustic sensor, a visual sensor, a semiconducting device, and a thermocouple configured to capture and transmit the user clothing data to a master control, and wherein the input user clothing data comprises identification of one or more items of clothing currently worn by the user;
determining an approximate age of the user based on (i) biometric data transmitted from the monitoring device, wherein said biometric data comprises at least ambient temperature associated with the user, and (ii) said identification of the one or more items of clothing currently worn by the user transmitted from the monitoring device;
receiving input room temperature data captured and transmitted from a sensor positioned in a room currently occupied by the user, wherein said input room temperature data comprises one or more temperature measurements of the room currently occupied by the user; and
providing instruction to the user to move to a given area in the room currently occupied by the user based on (i) the input user area temperature data, (ii) the input user clothing data, (iii) the input room temperature data and (iv) said approximate age of the user.

21. The system as claimed in claim 20, wherein the processor and memory are further configured for: (i) determining an optimal temperature for the user, (ii) receiving an input from the user regarding an optimal temperature desired by the user, and (iii) communicating the surrounding temperature to the master control, wherein the master control is configured to adjust the temperature in the surrounding area of the user to the optimal temperature, and wherein the at least one sensor on the user's clothing is at least one of a thermostat, a semiconducting material, a thermocouple, and an RFID tag, wherein the sensor is configured to detect a surrounding environmental temperature and inform the user.

22. The system as claimed in claim 21, wherein, based on user historical data, the at least one sensor is configured to recommend a preferred temperature as input to the master control.

23. The system as claimed in claim 20, wherein the master control is configured to (i) monitor the temperature in the surrounding area of the user and modify the temperature accordingly by raising or lowering the temperature and (ii) automatically control an air conditioning unit.

24. A system for controlling temperature in an area, the area being sub-divided into at least two or more regions, the system comprising at least a processor and a memory, and the system being configured for:
receiving input user area temperature data captured and transmitted from (i) a first sensor affixed to a first user's clothing in a first of the two or more regions and (ii) a second sensor affixed to a second user's clothing in a second of the two or more regions, wherein said input user area temperature data comprises one or more temperature measurements of a surrounding area of the corresponding user;

receiving input user clothing data captured and transmitted from at least one monitoring device, wherein said input user clothing data comprises identification of one or more items of clothing currently worn by at least the first user and the second user;

determining an approximate age of the first user and the second user based on (i) biometric data transmitted from the monitoring device, wherein said biometric data comprises at least ambient temperature associated with the first user and the second user, and (ii) said identification of the one or more items of clothing currently worn by the first user and the second user transmitted from the monitoring device;

receiving input region temperature data captured and transmitted from at least (i) a sensor positioned in the region currently occupied by the first user and (ii) a sensor positioned in the region currently occupied by the second user, wherein said input region temperature data comprises one or more temperature measurements of the region currently occupied by the corresponding user;

transmitting (i) the input user area temperature data, (ii) the input user clothing data and (iii) the input region temperature data to the master control for controlling the temperature of the area and the temperature of the at least two or more regions; and providing instruction to each of the first user and the second user to move to one of the two or more regions based on (i) said input user area temperature data for the first user and the second user, (ii) said input user clothing data for the first user and the second user, (iii) said input region temperature data for the two or more regions, and (iv) said approximate age of each of the first user and the second user.

25. A system for controlling temperature in an area, the system comprising at least a processor and a memory, and the system being configured for:

receiving, as input, a temperature setting from each of a plurality of users, wherein the users are located in the area and the input is transmitted to a master control for the area, and wherein the temperature setting from each of the plurality of users comprises:

one or more temperature measurements of a portion of the area surrounding the corresponding user; and identification of one or more items of clothing currently worn by the corresponding user;

an approximate age of each of the plurality of users based on (i) biometric data, wherein said biometric data comprises at least ambient temperature associated with each of the plurality of users, and (ii) the identification of the one or more items of clothing currently worn by each of the plurality of users; and providing instruction to each of the plurality of users to move to a given portion of the area based on (i) said one or more temperature measurements, (ii) said identification of one or more items of clothing, and (iii) said approximate age of each of the plurality of users.

* * * * *